Patented Mar. 16, 1948

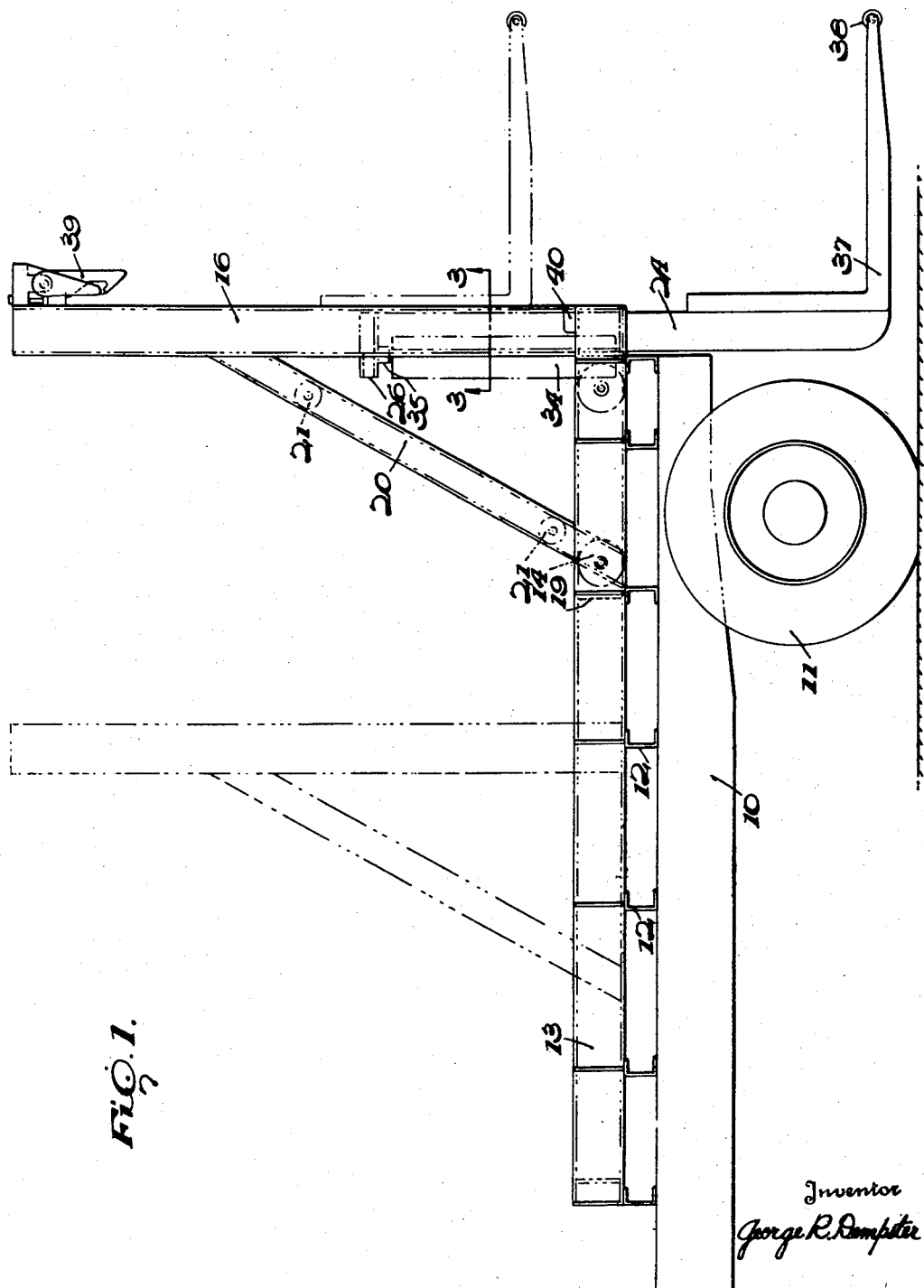

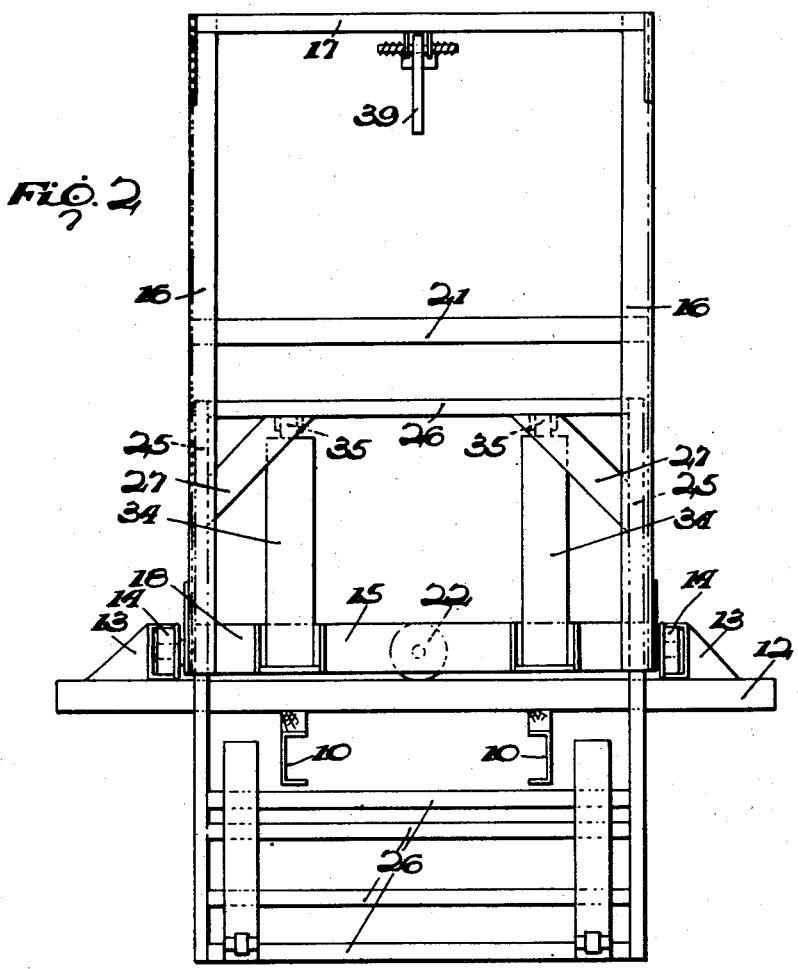
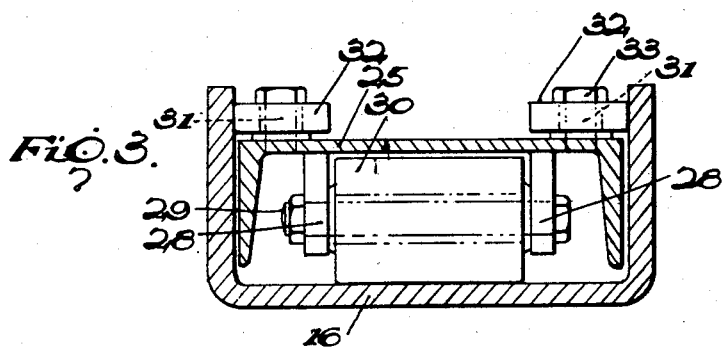

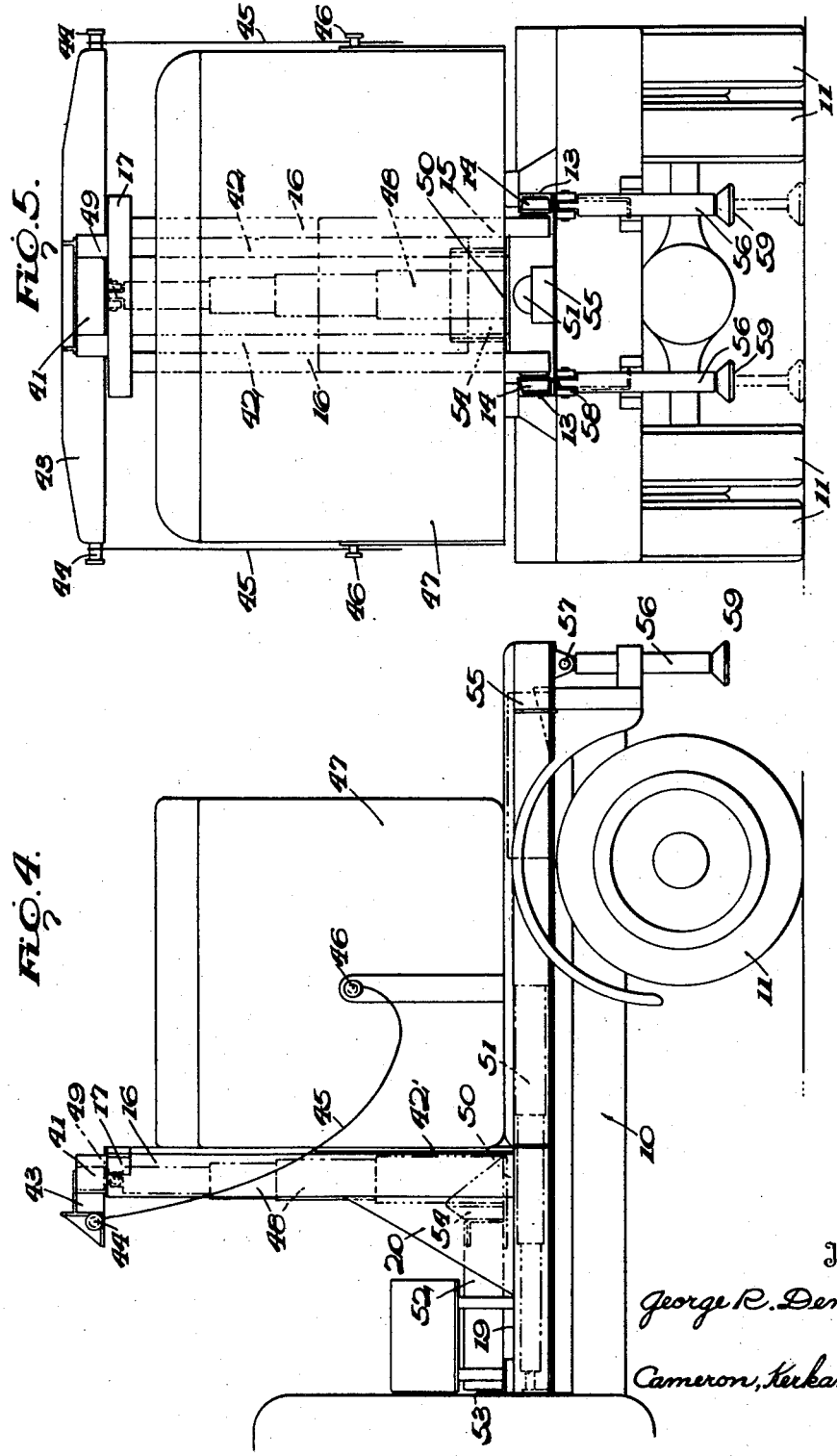

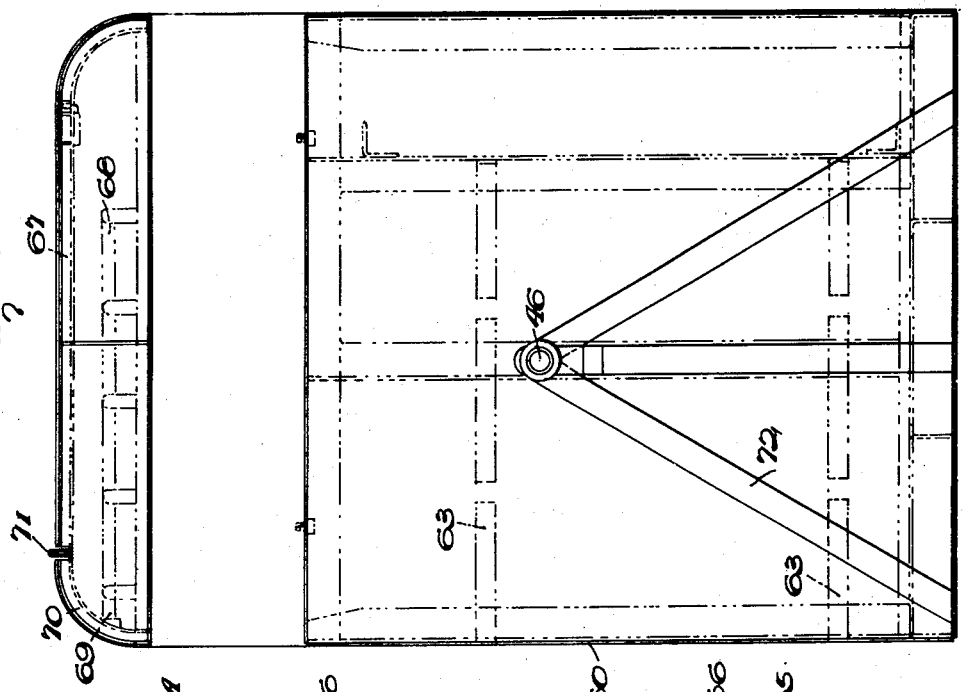
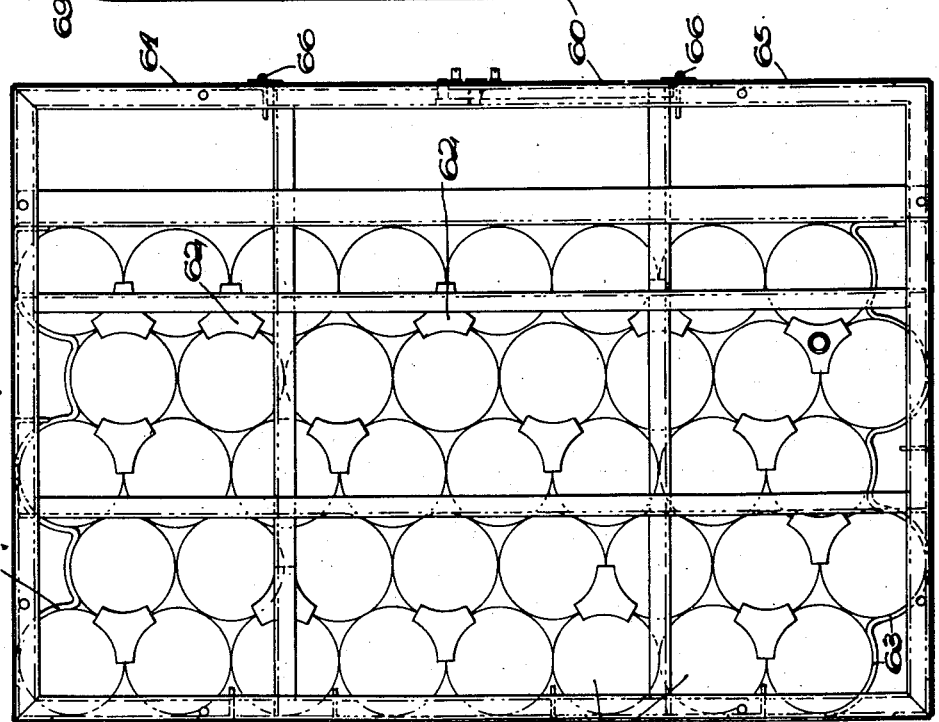

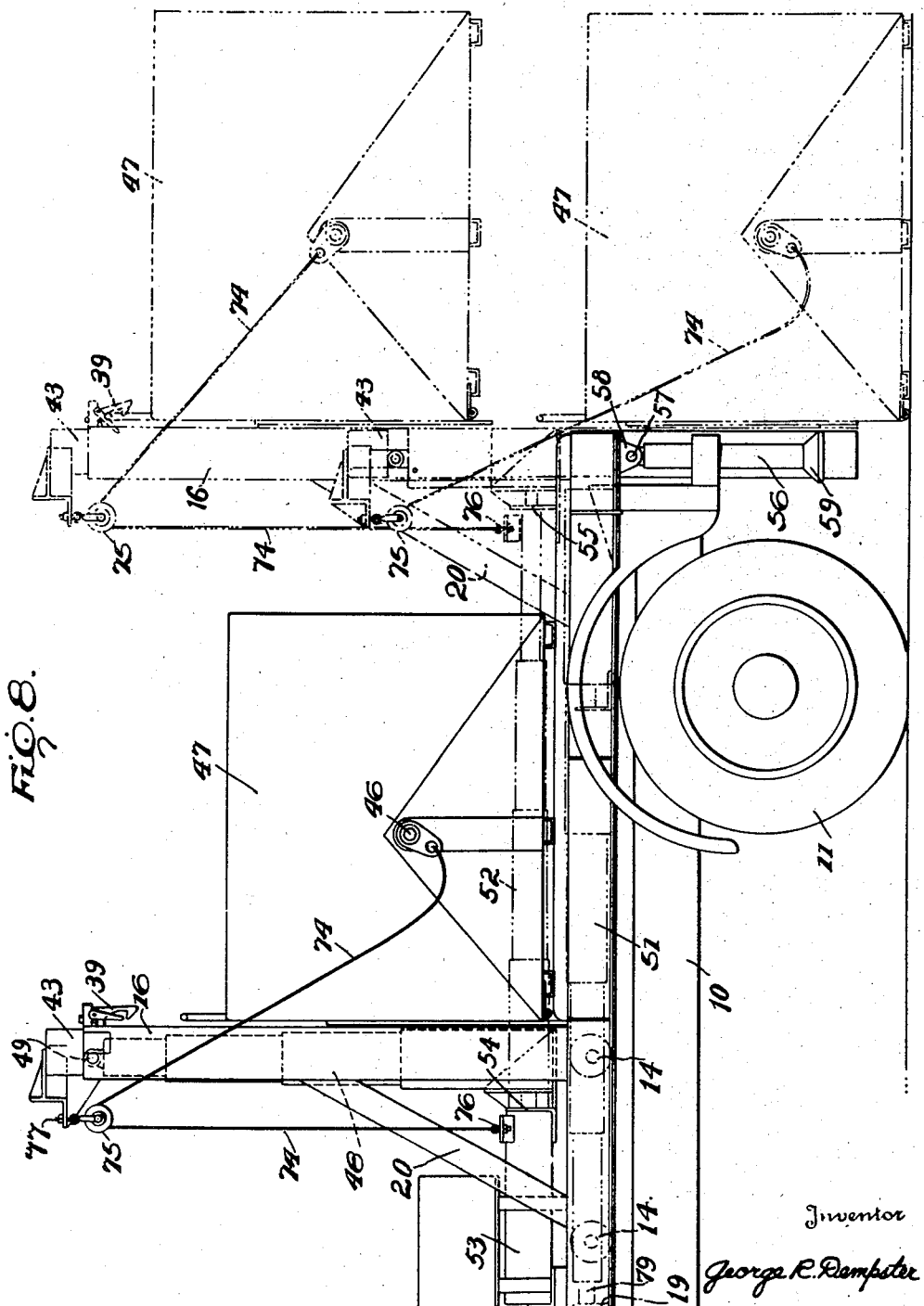

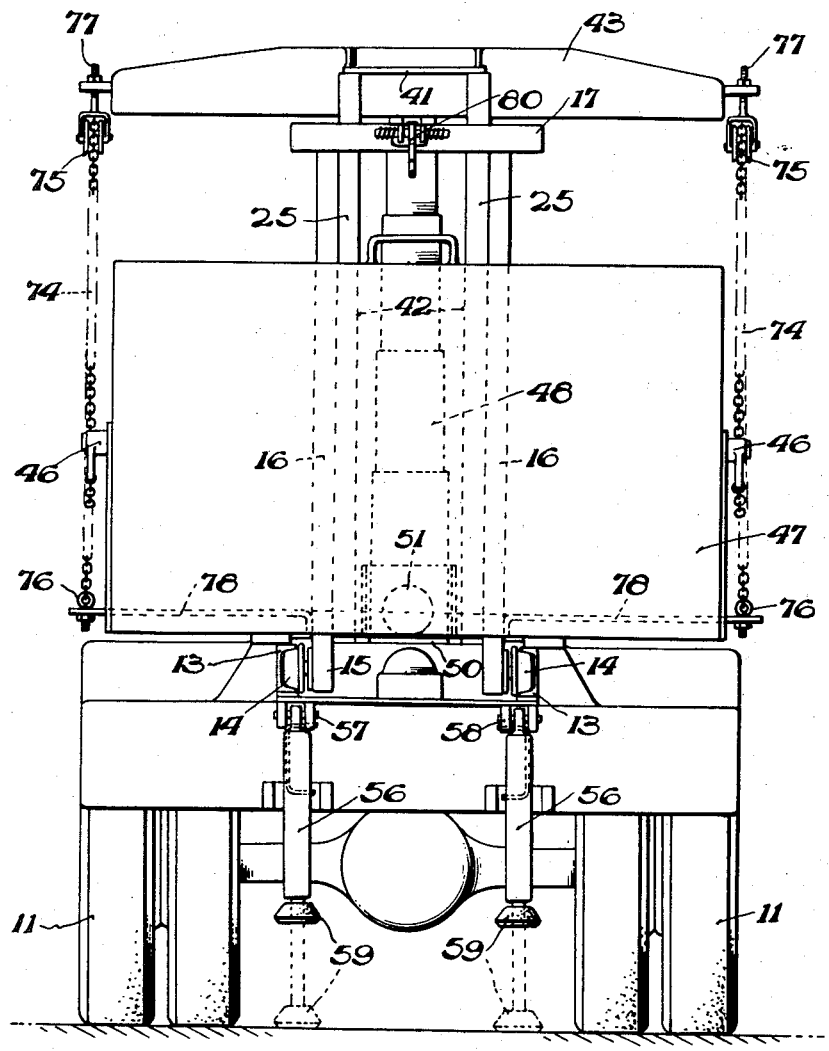

2,437,806

UNITED STATES PATENT OFFICE 2,437,806

TRANSPORTING EQUIPMENT

George R. Dempster, Knoxville, Tenn.

Application November 30, 1944, Serial No. 565,837

23 Claims. (Cl. 214—65)

This invention relates to transporting equipment of the type adapted to elevate and lower containers or other loads with respect to a rig suitably mounted on the chassis of a truck or other appropriate vehicle, this application being a continuation in part of my application Serial No. 532,491, filed April 24, 1944, abandoned December 4, 1947.

It has heretofore been proposed to provide transporting equipment of the type employing a rig mounted on a vehicle and having a movable load carrying means, as a fork which can be engaged under a container or other suitable load or an elevator on which the container or other load may be supported, that can be elevated with respect to the rig for transportation. Some equipment of this character has been of the type wherein the load carrying means is actuated by a pivoted boom, but while highly suitable for many services, it has a certain disadvantage in that the container or other load is tilted as it is raised by the boom. Other equipment of this character has employed a vertically movable elevator, but whereas the boom-carried load can move the container or other load forwardly or at least partly over the rear axle so as to increase stability, the vertically movable elevator has the disadvantage that the container or other load is moved vertically at the rear of the rear axle so that instability is increased by its elevation.

It is an object of this invention to provide improved transporting equipment of the type employing means for vertically elevating and lowering a container or other suitable load which also includes means whereby the container or other load may be moved after elevation to a position of increased stability without tilting the same.

Another object of this invention is to provide a device of the type just characterized wherein the container or other load is first raised vertically, and then moved horizontally, so that the container or other load may be moved forwardly to a desired position for stability during transportation.

Another object of this invention is to provide a device of the type just characterized wherein the load carrying means may take the form of a fork for engagement under a container or other load or an elevating mechanism from which the container or other load is suspended.

Another object of this invention is to provide an improved transporting equipment of the type employing means for elevating and depositing a container or other load which includes mechanism for raising and lowering the container or other load in a vertical direction, and mechanism for shifting the container or other load in a horizontal direction after it is elevated so as to dispose the same in a desired location with respect to the transporting vehicle.

Another object of this invention is to provide a device of the type last characterized which, while applicable to the handling of a variety of containers and loads, has particular utility for handling fluid containers that have to be removed and refilled periodically as they become exhausted and are desirably varied in location when serving as sources of fluid, permitting high flexibility of use at a minimum investment in equipment because of the continuity of service provided for the containers.

Another object of this invention is to provide an improved device of the type characterized which may be constructed as a unit so that it may be readily applied to a truck chassis, although if preferred it may be built onto the chassis originally.

Another object of this invention is to provide a device of the type above characterized which is simple and inexpensive in construction, strong and durable, and highly efficient in operation.

Other objects will appear as the description of the invention proceeds.

The invention is capable of receiving a variety of mechanical expressions, three of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures, Figs. 1 and 2 are side and rear elevations of transporting equipment of the fork type embodying the present invention and shown somewhat diagrammatically to better illustrate the principles of the present invention;

Fig. 3 is an enlarged cross section on the line 3—3 of Fig. 1;

Figs. 4 and 5 are side and rear elevations of transporting equipment of the cross-arm elevator type embodying the present invention and also shown somewhat diagrammatically for similar reasons;

Figs. 6 and 7 are top (with cover removed) and side views of a container for manifolded fluid tanks, cylinders or the like, also shown somewhat diagrammatically, for using which the embodiments of the present invention possess particular utility; and Figs. 8 and 9 are a side elevation and a rear elevation of yet another embodiment also shown somewhat diagrammatically.

Referring in detail to the drawings, 10 designates the chassis of a truck or any other suitable vehicle mounted on wheels 11. Mounted on said chassis 10 is a base or frame for the equipment to be described, said base or frame being of any suitable construction and as shown being composed of a suitable number of channel-shaped transverse members 12 which, as shown in Fig. 2, may extend on either side of the chassis 10 so as to provide a base that is wider than said chassis. Said transverse members 12 may be secured to the member 10 in any suitable way, either permanently or for detachment therefrom. Mounted on said transverse members 12, at or adjacent the opposite extremities thereof, are a pair of parallel longitudinal channel-shaped members 13 attached to the members 12 in any suitable way and constituting a unit therewith. Additional intermediate longitudinals may be employed if desired. Said channel-shaped longitudinally extending members 13 have their channel-shaped recesses directed inwardly, as shown in Fig. 2, so that they provide a pair of parallel horizontal tracks for the carriage next to be described.

Mounted on the channel-shaped tracks 13, by means of rollers 14, is a carriage 15 of any suitable construction. As shown, said carriage comprises a pair of vertical parallel upright channel-shaped members 16, with their channel-shaped recesses faced inwardly, and said uprights 16 are suitably braced by transverse members 17, 18 so as to provide a rigid rectangular frame. The base of said carriage extends forwardly on the chassis as a rigid rectangular frame of any suitable construction, as indicated at 19, and provides mountings for a pair of rollers at each side of the frame. Diagonally extending braces 20 extend between the uprights 16 and the base 19 so as to provide adequate rigidity of the carriage in the fore and aft direction, and the diagonal braces 20 may in turn be reenforced by transverse members 21.

For moving the carriage 15 forwardly and rearwardly on the tracks 13, mechanism of any suitable character, which may be hydraulic, screw, etc., is mounted on the base and suitably connected to the carriage 15, being shown as in the form of a cylinder with double acting piston or plunger diagrammatically indicated at 22, and preferably disposed in the fore and aft medial plane of the base, although if preferred a pair of such devices may be provided one at each side of the base or hydraulic mechanism may be used of the form hereinafter referred to with respect to the embodiment of Figs. 4 and 5. It is to be understood that when hydraulic mechanism is used it is provided with suitable piping and control valves for admitting and exhausting any suitable pressure fluid to and from either one or the other side of the piston so that by hydraulically moving the piston in one or the other direction the carriage 15 can be positively moved from the position shown in solid lines in Fig. 1 to a forwardly disposed desired position, such as illustrated in dotted lines in Fig. 1, or vice versa. The control valves or other control means are desirably located in the cab of the truck or other vehicle.

Mounted on said carriage 15 is a second carriage 24 of any suitable construction, here shown as composed of a pair of vertically disposed parallel channel-shaped side members 25 connected by a suitable number of transverse members 26 to form with said side members 25 a rigid rectangular frame. Suitable diagonal bracing members 27 may also be employed to give additional rigidity. Carriage 24 is constructed for movement up and down on the tracks provided by the channel-shaped uprights 16, and to this end, as shown (see particularly Fig. 3), the channel-shaped side members 25 have their recesses facing outwardly and they are of such dimension that they move freely in but are guided by the channel-shaped tracks 16. Mounted on each side member 25 are a suitable number of pairs of lugs 28 which are apertured to provide bearings for bolts or stub shafts 29 on which are rotatably mounted rollers 30 adapted to engage the inside surface of the intermediate wall of the channel 16. Also mounted on the side members 25 are other pairs of outwardly extending lugs 31 of any suitable construction to receive rollers 32 retained thereon in any suitable way, as by nuts 33, said pair of rollers 32 being so disposed that they are in rolling contact with the inside surface of the two side walls of the channel 16. It is to be understood that any suitable number of rollers 30, and any suitable number of pairs of rollers 32 may be disposed at and arranged along each side of the carriage 24.

Suitable mechanism which is preferably but not necessarily hydraulic is also provided for raising and lowering the carriage 24 in the carriage 15. While a single hydraulic device may be disposed vertically in the vertical medial plane of the carriage 24, which may take the form hereinafter disclosed with respect to the embodiment of Figs. 4 and 5, as shown a pair of hydraulic cylinders 34 are suitably mounted at their bases in the carriage 15 and the pistons or plungers thereof are suitably secured to the upper transverse member 26 of the carriage 24, as shown at 35, so that when said hydraulic mechanism is actuated the carriage 24 may be moved upwardly or downwardly within the tracks defined by the uprights 16 of the carriage 15. It is to be understood that the hydraulic mechanism 34 is provided with suitable piping and control valves, the latter preferably disposed in the cab of the vehicle, so that by admission of the pressure fluid below the pistons or plungers of said mechanism the carriage 24 may be elevated. While, if preferred, piping and control valves may be furnished to permit introduction of pressure fluid to the upper ends of the cylinders, this is ordinarily unnecessary as the weight of the carriage 24, with or without its load, is ordinarily sufficient to discharge the fluid from beneath the pistons or plungers of the hydraulic mechanism 34 when the appropriate control valve is open.

Mounted on said carriage 24 in any suitable way is load carrying means in the form of a fork 37 of any suitable construction and attached to the transverse members 26 of the carriage 24 in any suitable way. As shown, said fork 37 is composed of members of right angular construction which extend rearwardly to any suitable distance, being provided if desired with antifriction rollers 38.

If desired, any suitable mechanism for retaining a container or other load on the fork may be provided. As shown, the upper transverse member 17 of the carriage 15 has suitably mounted thereon an automatic hook 39 adapted to engage a bail on a container, for example, and lock therewith until the bail is slightly raised with respect to the hook, whereupon the hook is automatically disengaged from the bail. For example, the automatic hook may be of the type disclosed in my application Serial No. 484,636, filed April 26, 1943, now Patent No. 2,369,722, granted February 20, 1945.

Assuming that the transporting equipment is to be used for transporting containers provided with runners or skids so that their bottoms are elevated above the surface of the ground, although it is to be understood that the invention may be used for transporting any other suitable type of load, the hydraulic mechanism 22 is actuated to move the carriage 15 to the rear extremity of the tracks 13, and any suitable stop may be provided to prevent overrun of the carriage 15. The hydraulic mechanism 34 is then operated to lower the fork 37 to the position shown in full lines in Fig. 1, and if desired suitable stops may be provided to limit the extent to which the carriage 24 may be moved downwardly. The truck can then be backed so as to introduce the fork 37 under the bottom of a container. The hydraulic mechanism 34 is then operated to elevate the carriage 24 to the position shown in dotted lines at the right of Fig. 1. During this movement the side frames 25 of the carriage 24 are guided in the channels 16 by the cooperation of the rollers 30 and 32 with the intermediate and side surfaces at the inside of the channel-shaped tracks. Then the hydraulic mechanism 22 is operated to move the carriage 15 on its rollers 14 along the tracks 13, with the carriage 24 and its load supported on the fork 37 carried thereby, to a forward position such as shown in dotted lines in Fig. 1, in which position the load is at least over the rear axle so that it is highly stable. Thereupon the carriage 24 with its container may be lowered so that the container rests on the tracks 13, and if desired stops 40 may be provided to lock the container against rearward movement on said tracks.

When the truck has been driven to the place of discharge, and assuming that the container has been lowered onto the tracks 13, the hydraulic mechanism 34 may be actuated to slightly elevate the carriage 24 to lift the container off the tracks 13, after which the hydraulic mechanism 22 may be actuated to move the carriage 15 rearwardly until the carriage 24 has passed to a position in which it may be lowered past the end of the rig whereupon the hydraulic mechanism 34 is again operated to lower the carriage 24 to the position shown in full lines in Fig. 1, setting the container on the ground. Now the truck may be moved forwardly to disengage the fork from the container and proceed to pick up another container.

In place of elevating and depositing containers or other loads by means of a fork or the like introduced beneath the same, it is sometimes preferable to raise and lower the load by means of elevating mechanism from which the load is suspended. An embodiment of the present invention using load carrying mechanism in the form of a cross arm mounted on the vertically movable carriage, and from which the load may be suspended in any suitable way, is shown in Figs. 4 and 5.

As here shown, the chassis 10 of the truck or other suitable vehicle, mounted on wheels 11, carries a base or frame which may be the same as or similar to that described in conjunction with the embodiments of Figs. 1 to 3. As here shown, however, the parallel longitudinal channel-shaped members 13 which provide the tracks for the rollers 14 on carriage 15 are placed closer together than in the embodiment of Figs. 1 to 3 so that said carriage 15 is relatively narrow in a transverse direction but still symmetrically disposed with respect to the fore and aft medial line of the chassis. As in the embodiment of Figs. 1 to 3, the carriage is shown as having a pair of vertical parallel channel-shaped members 16, with their channel-shaped recesses faced inwardly to provide tracks for a vertically movable carriage, and said uprights are suitably connected and braced so as to provide a rigid rectangular frame, the upper transverse member being shown at 17, and if desired said member may be provided with an automatic hook as in the embodiment of Figs. 1 to 3. The base of said carriage extends forwardly on the chassis as a rigid rectangular frame of any suitable construction, as indicated at 19, and provides mountings for the rollers 14 at each side of the frame. Suitable bracing 20 may extend between each upright 16 and the base 19 so as to provide adequate rigidity to the carriage. As so far described the carriage, except for the transverse spacing of the uprights 16, may be of substantially the same construction as heretofore described in conjunction with the embodiments of Figs. 1 to 3.

Mounted for vertical movement on the carriage 15 is a second carriage 41 composed of vertically extending upright members 42 and any suitable number of transverse members connecting and bracing the same so as to provide an adequately rigid rectangular frame. Members 42 may also carry a transverse plate 42' against which the container or other load will bear. Upright members 42 may take the form of outwardly facing channel-shaped members, as in the embodiment of Figs. 1 to 3, and any suitable rollers, such as shown for example at 30, 32 in Fig. 3, may be interposed between the uprights 42 and 16 to facilitate the raising and lowering movements of the carriage. Mounted at the top of the frame of this second carriage or elevator, and either constituting a part of the transverse connections between uprights 42 or suitably attached to the uppermost transverse member of the elevator frame, is a cross arm 43 which may extend to any desired extent on either side of the carriage, being shown as approximately the same length as the transverse width of the chassis frame, although it may be made longer or shorter as desired depending upon the size of the container or other load to be handled. In this embodiment of the invention as shown the container or other load is to be suspended from the cross arm 43 by means of chains or cables, and to this end pins 44 project from each extremity of the cross arm and carry suitable lengths of chain 45 provided at their extremities with hooks or other suitable attaching means for engagement with headed pins 46 on the container 47. Any other suitable means for carrying the load from the arm 43 may be used however.

For raising and lowering the second carriage or elevator, mechanism, preferably hydraulic, is carried by the carriage 15 and cooperates with a suitable transverse member on said carriage, as the cross arm 43. The hydraulic mechanism may take the form referred to in conjunction with the embodiments of Figs. 1 to 3 but it is here illustrated as comprising an elevating jack composed of four telescopically arranged sleeves 48 suitably attached to or abutting against the cross arm 43 or some other suitable transverse member on the carriage 41, as shown at 49, and having abutment on the carriage 15 at 50. It is to be understood that suitable control means, as piping and control valves, the latter preferably arranged in the cab of the vehicle, are associated with this hydraulic jack but have been omitted from the drawing in the interest of clarity. As the weight of the elevator with or without its load, is sufficient to lower the carriage when escape of liquid from the jack 48 is permitted, it is sufficient to provide hydraulic mechanism for moving the elevator carriage upwardly.

The embodiment of Figs. 4 and 5 shows an alternative construction and arrangement of hydraulic mechanism for moving the carriage 15 forwardly and rearwardly with respect to the chassis, although screw or other suitable mechanism may be used if preferred. In this embodiment as shown this hydraulic mechanism takes the form of a pair of hydraulic jacks 51 and 52 arranged in vertical alignment with the fore and aft medial line of the chassis and each composed of a plurality of telescopically acting sleeves similar to that shown at 48. As illustrated, the upper jack 52 is abutted in any suitable way at 53 on the base of the unit and has its movable end attached to or abutting against a suitable plate 54 on the carriage 15, so that when the jack is extended by hydraulic pressure the carriage 15 will move from the position shown in Fig. 4 to a position wherein the carriage 15 and elevator 41 are suitably disposed for raising containers from the ground or depositing containers on the ground. The lower jack 51 is abutted on the base at 55 and at its opposite end is attached to or abutted against the carriage 15 so that when the sleeves are extended to the position shown in Fig. 4 the carriage will be moved from its rearmost position above referred to to the position shown in Fig. 4 wherein the container or other load has its center of gravity forward of the vertical plane containing the axis of the rear wheels 11. It is to be understood that the two jacks 51 and 52 are provided with suitable piping and control valves, the latter preferably arranged in the cab of the vehicle, so that the two jacks may be operated as desired for movement of the carriage 15 in one direction or the other, it being understood that when the jack 51 is extended by hydraulic pressure, the jack 52 is collapsed telescopically by the extension of the jack 51, and the converse occurs when jack 52 is extended by hydraulic pressure.

The embodiment of Figs. 4 and 5 discloses an additional feature, which may also be employed in the embodiment of Figs. 1 to 3, for increasing the stability of the vehicle while raising and lowering the load, a feature that is desirable if there is any danger that the weight of the load may cause the chassis to pivot about the axis of the rear wheels. As here shown, the frame carries a pair of stabilizing jacks 56 suitably mounted on the base of the unit, as by means of pins 57 extending through lugs 58 carried by the underside of the frame. While said jacks may be placed at any suitable location they are desirably arranged vertically beneath the tracks 13 for the carriage 15. The ram of each jack is provided with a suitable foot 59 so that when the rams are hydraulically operated to displace the feet 59 downwardly to the dotted line position shown in Fig. 5 stability of the unit is assured. It is to be understood that the jacks 56 are also provided with suitable piping and control valves, the latter preferably arranged in the cab of the vehicle, so that the feet 59 may be lowered into engagement with the ground or elevated to the position shown in full lines in Figs. 4 and 5 when the load has been either deposited on the ground or disposed somewhat forwardly of the rear axle for transportation as shown in Fig. 4.

In substance the operation of the embodiment of Figs. 4 and 5 is the same as that of Figs. 1 to 3. The vehicle may be backed up to the container or other load to be transported, and the carriage 41, if not already in lowered position, may be lowered, by releasing the liquid from the hydraulic jack 48, to such position that the chains 45 or other connecting means may be suitably attached to the pins 46. The hydraulic mechanism 48 is then operated to raise the load vertically, the carriage 41 rising between the uprights 16 with the load engaging the plate 42' which moves with the carriage. If desired the container or the rearmost faces of said uprights may be provided with suitable rollers or other antifriction means. When the elevator has lifted the bottom of the load above the top surface of the frame of the unit, the hydraulic jack 51 is operated to move the carriage 15 forwardly, carriage 15 rolling on the tracks 13 by means of the rollers 14, until the load is moved to the desired position of stability, preferably with its center of gravity forward of the vertical plane containing the axis of the rear wheels, as shown in Fig. 4. Thereupon the elevator 41 may be sufficiently lowered to deposit the load on the frame, and any suitable means may be associated with the load to prevent displacement during transportation. When the load is to be deposited on the ground the hydraulic mechanism 48 is again operated to lift the load off the frame, whereupon the hydraulic jack 52 is operated to move the carriage 15 rearwardly until the load is suspended over the ground. By releasing the liquid from the hydraulic jack 48 the elevator 41 may now be lowered until the load is deposited on the ground. If the size of the load is such as to introduce a possibility of upsetting the vehicle the hydraulic jacks 56 may be operated to engage the feet 59 with the ground when raising and lowering the load with respect thereto.

Figs. 8 and 9 show yet another embodiment of the present invention of the type employing elevating mechanism from which the load is suspended. Inasmuch as the rig, except for the provisions for suspending the load, is, or may be, the same as that hereinabove described in conjunction with the embodiment of Figs. 4 and 5, the same reference characters have been used so that the description of Figs. 4 and 5 may apply to like parts in Fig. 8.

In the embodiment of Figs. 8 and 9, the carriage 15, as in the preceding embodiments, is provided with rollers 14 running in channel-shaped tracks 13 and is moved forwardly and rearwardly on said tracks by any suitable means such as hydraulic mechanism 51 and 52 suitably connected to the carriage 15 at 54 and 79. Carriage 15 also includes a pair of vertical upright channel-shaped members 16, with their channel-shaped recesses faced inwardly, whose upper ends are connected by a suitable transverse member 17, and mounted for vertical movement in the ways so provided, and under the control of suitable mechanism such as a hydraulic mechanism 48 as in Figs. 4 and 5, is a second carriage 42, here shown as including a pair of vertically disposed parallel channel-shaped side members 25 between which and the ways 16 are rollers (see Fig. 3) all as explained with greater detail in connection with the embodiment of Figs. 1 to 3. In this embodiment, however, the carriage 42 is provided with a cross arm 43 as in the embodiment of Figs. 4 and 5, but instead of suspending the load from pins 44 at the ends of the cross arm 43, said cross arm is provided at or adjacent each end, or otherwise suitably disposed between the center and each end, with a sheave 75, suitably supported from the cross arm, preferably so that it may swivel with respect thereto about a vertical axis 77. Threaded through each sheave is a cable 74 which, at one end, is extended downwardly to any suitable anchoring means 76 provided on that part of the forwardly and rearwardly movable carriage which does not partake of upward and downward movement in the uprights 16, here shown as provided by transversely extending members 78 on the carriage 15. When the cables are designed to be disposed substantially in alignment with the uprights 16, the ends of the cables may be anchored to said uprights or suitable projections thereon. When, as in the embodiments of Figs. 4 and 5, said uprights 16 are disposed at some distance from the ends of the container when the latter is in position on the rig, said anchorages 76 may be provided on any other suitable part of the rigid framework, as on members 78 of the forwardly and rearwardly movable carriage. The other ends of the cables 74 are provided with hooks or other suitable devices for attachment to pins 46 or the like on the ends of the container as in the embodiments of Figs. 4 and 5. As in the latter embodiment, the transverse member 17 may also be provided with an automatic hook 39 as in Figs. 1 and 2 (see Fig. 8) for cooperation at 80 (Fig. 9) with a suitable bail on the container, and hydraulic stabilizing jacks 56 may also be provided as explained in greater detail with respect to Figs. 4 and 5.

This latter method of suspending the load from the vertically movable carriage has the advantage that the hydraulic or other mechanism for moving the vertically movable carriage has to move only one-half as far as the load when elevating and lowering the latter.

It will thus be observed that with each structure conforming with the present invention the container or other load may be moved forwardly with respect to the vertical position to which the container or other load is elevated, so as to increase the stability of the transported load, but without tilting the container or load. In fact, the load may be moved forwardly to a greater distance than is practicable with a boom-operated elevating mechanism and thereby greater stability obtained. The container or other load is first moved vertically without any component of horizontal movement, and then it is moved horizontally to the position of desired stability, in which position it can be lowered so that it is supported entirely on the base of the rig. At the same time the rig is of simple and inexpensive construction, it is composed of rugged parts that are easy to fabricate and assemble, and the device is highly efficient in its use for raising and lowering, and transporting, any container or load that may be picked up or deposited by the use of elevating mechanism such as here disclosed. The mechanism for moving the carriage forwardly and rearwardly, for raising and lowering the load carrying mechanism and for operating the jacks is preferably driven from the engine of the vehicle, although separate motive means may be used if preferred, and controlled from the cab of the vehicle. While hydraulic mechanism is preferred, screw or other suitable driving mechanism may be used instead when such is desired.

As so far described the invention has been explained without reference to any particular container or load, because as will be apparent to those skilled in the art the transporting equipment as so far described is applicable to a wide variety of uses. However, the present invention has particular utility when used as next to be explained.

It is sometimes desirable to employ fluid containers for placing relatively large quantities of fluid at variable locations convenient to the places at which the fluid is to be used. For example, in welding, metal cutting and comparable operations it is frequently desirable to dispose at variable locations convenient to where the work is to be performed quantities of oxygen under pressure, the quantity being larger than can be contained in a single tank or cylinder of a size appropriate for this purpose. Furthermore, in the interest of economy, initial investment, etc., it is highly desirable that the provisions for supplying the fluid be such that there is substantial continuity of service of the various parts of the equipment employed.

In conformity with the present invention fluid containers are provided in the form of a multiple of appropriate individual tanks or cylinders nested compactly in a housing suitably constructed for transportation, said tanks or cylinders within the housing being manifolded so as to provide a common outlet for the fluid. Hence the contents of all of said tanks or cylinders together constitute a single source of fluid which may be deposited at any convenient location, while once said source has become exhausted it can be replaced by a like unit while the emptied unit is removed and refilled. Thereby the container units are in substantially continuous service while it is only necessary to use enough transporting rigs to afford the requisite servicing, so that they also may be in substantially continuous service.

As shown in Figs. 6 and 7, the container 60 takes the form of a generally rectangular box-like structure of any suitable size and construction to provide the requisite strength and rigidity. Nested within said container is a multiple of vertically disposed tanks or cylinders 61 of any suitable size and construction such as are found to be appropriate for transporting the fluid in question. Said tanks or cylinders 61 are preferably arranged in staggered relationship in the interest of compactness, and they may be retained in position in any suitable way as by triangular-shaped clamping elements 62 which lock the containers rigidly in position but which enable individual tanks to be released and removed whenever such is found desirable. Appropriate frame elements 63 may be provided at the ends of the container to hold the tanks or cylinders in position, or if preferred other provisions for locating them may be provided. For gaining access to the tanks or cylinders when necessary, any suitable provisions may be made. The container may have a hinged cover or one or more of the lateral walls of the container may be hinged or have hinged doors for gaining access to the interior of the container. As shown, the rear wall of the container is provided with a pair of doors 64 and 65 mounted on suitable hinges 66 and provided with suitable locking means (not shown). Where access to the container is available at the sides of the container the cover 67 may be rigidly but releasably secured in position. Said cover may take any suitable form, being shown as of somewhat domed construction, and within the space provided by the cover may be disposed the manifolding diagrammatically indicated at 68 in Fig. 7, so that all of the tanks or cylinders 61 may be connected to a common outlet 69. To gain ready access to said outlet 69 the front curved section 70 of the cover 67, or a portion thereof, is hinged at 71 so that it may be readily raised.

Each end of the container 60 is provided with a pin 46 as heretofore referred to in conjunction with the embodiments of Figs. 4, 5, 8 and 9, said pin preferably being mounted at the apex of a relatively rigid triangular frame 72 suitably built into or onto the ends of the container so as to provide the requisite strength and rigidity for lifting and depositing the container when suspended by means of said pins.

While one particular construction of container with its enclosed tanks or cylinders, manifolding, positioning and retaining means, etc., has been illustrated and described, it is to be expressly understood that the present invention is not concerned with the details of the container construction, but with the use and combination of the elevating and transporting mechanism as heretofore described with a container enclosing suitably constructed, located and manifolded tanks, cylinders or other fluid containers to constitute a transportable unit that will afford a source of supply of a given fluid in excess of that which can properly be provided by a single transportable tank or cylinder while retaining the flexibility of use incident to placing the source of liquid in whatever position is desired.

From the foregoing explanation it will be apparent that a container with its set of tanks or cylinders may be charged with fluid at an appropriate place and readily transported by the equipment disclosed in Figs. 1 to 5, 8 and 9 to the most convenient location for the use of said fluid. At such location the container may be deposited and a like container which has become exhausted may be removed and taken to the place at which it is to be refilled. Thus the containers are in substantially continuous service on the one hand, and by having an appropriate number of transporting units or rigs they also may be kept in substantially continuous services in transporting filled containers to their various locations and removing empty containers therefrom. Thereby a material saving in the initial investment is obtained over practices heretofore proposed wherein the tanks or cylinders have required a separate vehicle for each unit because in such systems the vehicle is out of service throughout the period that the tanks or cylinders mounted thereon are in use.

While the embodiments of the invention illustrated on the drawings have been described with considerable particularity, it is to be expressly understood that the invention is not restricted thereto, as the same is capable of receiving a variety of mechanical expressions, some of which will now readily suggest themselves to those skilled in the art, while changes may be made in the details of construction, proportion of parts, etc., and other forms of containers, provisions for attachment and detachment of the load to and from the elevating mechanism, mechanism for moving the carriage or raising and lowering the load, etc., may be used, without departing from the spirit of the invention. For purposes of clarity, the hydraulic mechanism has been shown only diagrammatically, but it is to be expressly understood that the hydraulic mechanism includes all requisite piping, valves, etc., for supplying and controlling the application of pressure fluid to carry out the operations above described.

Reference is to be had to the appended claims for a definition of the invention.

What is claimed is:

1. In a transporting equipment, in combination with a base provided with horizontal tracks, a carriage having rollers mounted for movement on said tracks said carriage provided with vertically disposed ways, means for moving said carriage along said tracks, a second carriage forming a part of said first carriage and movable on the ways of said first carriage at right angles to said base, means on said first carriage for moving said second carriage on said first carriage, and load carrying means mounted on said second carriage and movable therewith.

2. In a transporting equipment, in combination with a base, a carriage mounted for movement on said base, means for moving said carriage on said base, a second carriage mounted on said first carriage and movable at right angles to said base, means for moving said second carriage on said first carriage, load carrying means mounted on said second carriage and movable therewith, and means for locking a load on said load carrying means to said first carriage when moved to a predetermined position by said second carriage.

3. In a transporting equipment, in combination with a base, a carriage mounted on said base for movement in a fore and aft direction, mechanism for operating said carriage, a second carriage mounted on said first carriage for movement in a vertical direction, mechanism on said first carriage for operating said second carriage, and a load carrying fork mounted on said second carriage and movable therewith.

4. In a transporting equipment, in combination with a base provided with ways, a carriage mounted on said ways for movement in a fore and aft direction, said carriage providing vertically disposed ways, mechanism for operating said carriage, elevating means mounted on said carriage for movement in a vertical direction along the ways of said first carriage, mechanism on said carriage for operating said elevating means, and a transverse load carrying arm mounted on said elevating means and movable therewith.

5. In a transporting equipment, in combination with a base, a carriage mounted on said base for movement in a fore and aft direction, mechanism for operating said carriage, a second carriage mounted on said first carriage for movement in a vertical direction, mechanism on said first carriage for operating said second carriage, load carrying means mounted on said second carriage and movable therewith, and an automatic hook on said first carriage for engagement with a load on said load carrying means when lifted by said second carriage.

6. In a transporting equipment, in combination with a base providing a pair of tracks extending longitudinally of said chassis, a container for cylinders, said container being bodily detachable from the chassis for charging and use separately from the truck, a carriage mounted on said tracks for forward and rearward movement thereon, mechanism mounted on said base for moving said carriage forwardly and rearwardly with respect to said chassis, a second carriage mounted on said first carriage for vertical upward and downward movement thereon, means carried by said first carriage for moving said second carriage upwardly and downwardly, and means carried by said second carriage for elevating and lowering said container.

7. In a transporting equipment, in combination with a base providing tracks extending longitudinally of said base, a carriage mounted for forward and rearward movement on said tracks, mechanism for moving said carriage forwardly and rearwardly on said tracks, said carriage also providing vertically extending tracks, a second carriage mounted on said last-named tracks for vertical upward and downward movement along said tracks, mechanism mounted on said first carriage for moving said second carriage upwardly and downwardly on said last-named tracks, and load carrying means mounted on said second carriage.

8. In a transporting equipment, the combination of a base to be carried by a truck chassis, means on said base providing horizontal parallel tracks, a carriage mounted on said tracks for horizontal movement thereon, mechanism for moving said carriage on said tracks, said carriage also providing a pair of vertical parallel tracks, a second carriage mounted for movement along said vertical tracks, hydraulic mechanism mounted on said first carriage for moving said second carriage on said vertical tracks, and a load carrying means mounted on said second carriage.

9. In a transporting equipment, in combination with a base to be carried by a truck chassis, means for elevating a load vertically and then moving it horizontally into a stabilized position with respect to the rear axle of the chassis, said means including horizontally extending tracks on said base, a carriage movable horizontally on said tracks, means on said base for moving said carriage horizontally, said carriage providing vertically extending tracks, a second carriage mounted for movement along said last-named tracks, means mounted on said first carriage for moving said second carriage vertically, and load carrying means mounted on said second carriage.

10. In a transporting equipment, in combination with a base to be carried by a truck chassis, means for elevating a load vertically and then moving it horizontally into a stabilized position with respect to the rear axle of the chassis, said means including horizontally extending tracks on said base, a carriage movable horizontally on said tracks, means on said base for moving said carriage horizontally, said carrige providing vertically extending tracks, a second carriage mounted on said last-named tracks, means mounted on said first carriage for moving said second carriage vertically, and load carrying means mounted on said second carriage, said last named means including a transverse arm disposed at the upper end of said second carriage and provided with means from which a load may be suspended.

11. In a transporting equipment, in combination with a base to be carried by a truck chassis, means for elevating a load vertically and then moving it horizontally into a stabilized position with respect to the rear axle of the chassis, said means including horizontally extending tracks on said base, a carriage movable horizontally on said tracks, means on said base for moving said carriage horizontally, said carriage providing vertically extending tracks, a second carriage mounted on said last-named tracks, means mounted on said first carriage for moving said second carriage vertically, and load carrying means mounted on said second carriage, said last-named means including a fork disposed at the lower end of said second carriage for engagement under a load to be moved.

12. In a transporting equipment, the combination of a base to be carried by a truck chassis, means for moving the load vertically and then horizontally over said base, said means including a fork for engagement with the load, a carriage on which said fork is mounted, vertically extending tracks along which said carriage is movable, means for moving said carriage vertically with respect to said tracks, a carriage on which said tracks are mounted, tracks for said last named carriage, and means for moving said two carriages horizontally on said last-named tracks.

13. In a transporting equipment, the combination of a base to be carried by a truck chassis, means for moving the load vertically and then horizontally over said base, said means including a transverse arm from which a load may be suspended, a carriage on which said arm is mounted, vertically extending tracks along which said carriage is movable, means for moving said carriage vertically with respect to said tracks, a carriage on which said tracks are mounted, tracks for said last-named carriage, and means for moving said two carriages horizontally on said last-named tracks.

14. In a transporting equipment, the combination with a base to be carried by a truck chassis, a load carrying arm adapted to support a load to be transported, a vertically movable carriage on which said load carrying arm is mounted, vertically extending tracks along which said carriage is movable, hydraulic mechanism for moving said carriage with respect to said tracks, a second carriage on which said tracks are mounted, horizontally extending tracks on said base on which said second carriage is movable, and mechanism mounted on said base for moving both of said carriages horizontally.

15. In a transporting equipment, the combination with a base to be carried by a truck chassis, load carrying means adapted to support a load to be transported, a vertically movable carriage on which said load carrying means is mounted, vertically extending tracks on which said carriage is movable, hydraulic mechanism for moving said carriage with respect to said tracks, a second carriage on which said tracks are mounted, horizontally extending tracks on said base on which said second carriage is movable, means mounted on said base for moving both of said carriages horizontally when said first carriage has been elevated with respect to said second carriage, means for locking the load to said second carriage when it has been elevated by the first carriage, said last-named means providing for the deposit of the load on said base when said carriages have been moved together forwardly on said last-named tracks, and means for preventing rearward movement of the load when it has been deposited on said tracks.

16. In a transporting equipment, in combination with a base to be carried by a truck chassis, means for elevating a load vertically and then moving it horizontally into a stabilized position with respect to the rear axle of the chassis, said means including horizontally extending tracks on said base, a carriage movable horizontally on said tracks, means on said base for moving said carriage horizontally, said carriage providing vertically extending tracks, a second carriage mounted on said last-named tracks, means mounted on said first carriage for moving said second carriage vertically, load carrying means mounted on said second carriage, and means mounted on said base and movable downwardly into engagement with the ground for stabilizing said equipment while moving said second carriage with and with respect to said first carriage.

17. In a transporting equipment, the combination of a base to be carried by a truck chassis, load carrying means adapted to support a load to be transported, a vertically movable carriage on which said load carrying means is mounted, vertically extending tracks on which said carriage is movable, hydraulic mechanism for moving said carriage with respect to said tracks, a second carriage on which said tracks are mounted, horizontally extending tracks on said base on which said second carriage is movable, mechanism mounted on said base for moving both of said carriages horizontally and hydraulic mechanism mounted on said base and movable downwardly into engagement with the ground for stabilizing said equipment while said load carrying means is supporting a load.

18. In a transporting equipment, the combination of a base carried by a truck chassis and provided with longitudinally extending tracks, a carriage mounted on said tracks for fore and aft movement, mechanism mounted on said base for moving said carriage, vertically extending tracks on said carriage, a second carriage mounted on said last named tracks for vertical movement, mechanism on said first carriage for moving said second carriage, container carrying means mounted on said second carriage, and a container for deposit from and movement to transporting position onto said base by said carriages including nested vertically extending manifolded cylinders for detachment from said carrying means and use separately from said chassis.

19. In a transporting equipment, in combination with a base to be carried by a truck chassis, a container enclosing nested, vertically extending manifolded cylinders, said container being bodily detachable from the chassis for charging and use separately from the truck, and means for elevating said container vertically and then moving it horizontally onto said base into a stabilized position with respect to the rear axle of the chassis.

20. In a transporting equipment, in combination with a base to be carried by a truck chassis, means for elevating a load vertically and then moving it horizontally into a stabilized position over the rear axle of the chassis, said means including horizontally extending tracks on said base, a carriage movable horizontally on said tracks, means on said base for moving said carriage horizontally, said carriage providing vertically extending tracks composed of inwardly facing channel members, a second carriage movable on said last-named tracks and having one set of rollers engaging the bottom of said channels and another set of rollers engaging the sides of said channels, means mounted on said first carriage for moving said second carriage vertically, and load carrying means mounted on and movable with said second carriage.

21. In a transporting equipment, the combination of a base to be carried by a truck chassis, means for moving the load vertically and then horizontally over said base, said means including a fork for insertion under the load upon rearward movement of the truck, a carriage on which said fork is mounted, vertically extending inwardly facing channel-shaped tracks, said carriage having one set of rollers engaging the bottom of said channels and another set of rollers engaging the sides of said channels, means for moving said carriage vertically with respect to said tracks, a carriage on which said tracks and last-named means are mounted, tracks for said last-named carriage, and means for moving said last-named carriage horizontally on said last-named tracks with said first-named carriage carried thereby when said first-named carriage is elevated with respect to said second carriage.

22. In a transporting equipment, the combination of a base to be carried by a truck chassis, means for moving the load vertically and then horizontally over said base, said means including a fork for insertion under the load upon rearward movement of the truck, a carriage on which said fork is mounted, vertically extending tracks along which said carriage is movable, means for moving said carriage vertically with respect to said tracks, a carriage on which said tracks and last-named means are mounted, tracks for said last-named carriage, means for moving said last-named carriage horizontally on said last-named tracks with said first-named carriage carried thereby when said first-named carriage is elevated with respect to said second carriage, and means for attaching the load to the second carriage when it has been elevated by said first carriage.

23. In a transporting equipment, in combination with a base to be carried by a truck chassis, means on said base providing a pair of parallel channel-shaped tracks, a carriage provided with rollers mounted on said tracks, mechanism for moving said carriage along said tracks, said carriage providing a pair of vertical parallel channel-shaped tracks, a second carriage provided with channel-shaped side members facing oppositely to and telescopically received in said last-named tracks and adapted to run in the channels of said last-named tracks, antifriction means interposed between said side members and associated tracks and housed within the oppositely facing channels thereof, mechanism carried by said first carriage for moving said second carriage along said last-named tracks, and load carrying means mounted on and movable with said second carriage.

GEORGE R. DEMPSTER.

REFERENCES CITED

The following references are of record in the file of this patent:

UNITED STATES PATENTS

| Number | Name | Date |
|---|---|---|
| 2,122,992 | Pride | July 5, 1938 |
| 2,127,938 | Pride | Aug. 23, 1938 |
| 2,305,148 | Dempster | Dec. 15, 1942 |
| 2,324,817 | Bratley | July 20, 1943 |
| 2,366,378 | Barrett | Jan. 2, 1945 |